Aug. 14, 1934.   J. C. HANSEN-ELLEHAMMER   1,970,082
PRODUCING OF FOAM BY MECHANICAL MEANS
Filed July 14, 1930
FIG. 2.
FIG. 1.
FIG. 3.
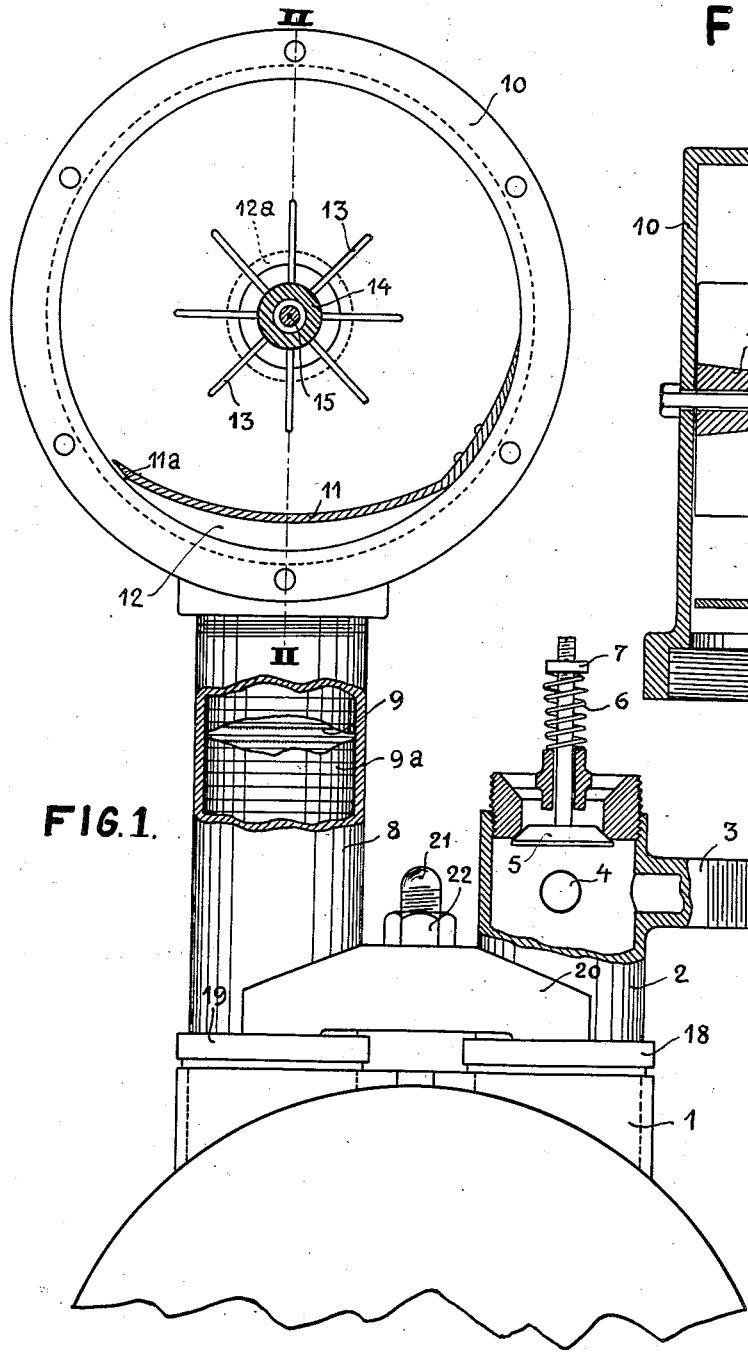
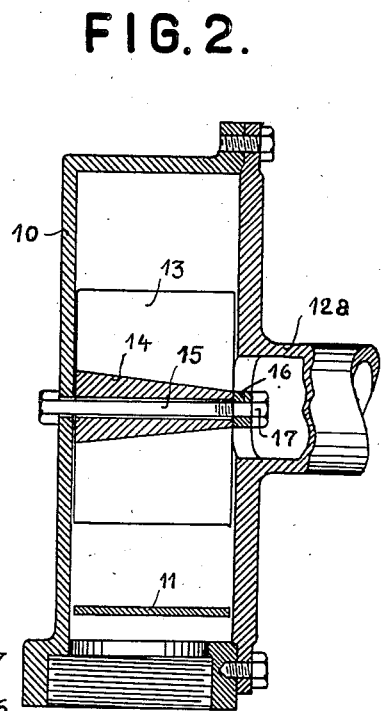
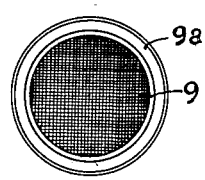
Inventor:
Jacob Christian Hansen-Ellehammer
By
Attorney Patented Aug. 14, 1934

1,970,082

UNITED STATES PATENT OFFICE 1,970,082

PRODUCING OF FOAM BY MECHANICAL MEANS

Jacob Christian Hansen-Ellehammer, Hellerup, Denmark

Application July 14, 1930, Serial No. 467,869
In Denmark November 2, 1929

10 Claims. (Cl. 261—121)

The present invention relates to a method of and apparatus for producing foam by mechanical means, and the method consists therein that by means of a preferably rotary pump a foam producing material in suspension in a suitable liquid, and the quantities of water and air necessary for the production of foam are forced through a series of essentially horizontal network or like members in an essentially vertical pipe, the first preparatory production of foam being thereby initiated. From the said pipe the body of foam is forced through an inlet into a cylindrical chamber, the jet of foam entering in a direction tangential to the surface of the cylinder. The said inlet is relatively narrow thus imparting to the material an excessively great speed of circulation along the cylinder walls (with a 1000 litres per minute pump the velocity may amount to 20 to 30 circulations per second when the diameter of the cylinder is about 200 mm.).

During this circulating and very rapid movement a thorough commingling of the particles of the foam producing liquid with those of the water and the air takes place, and a very fine foam is quickly produced i. e. foam composed of an enormously large number of very small air bubbles, the walls of which are made up of very thin liquid films. By the rotation the mass will also be subjected to a centrifugal process the finely divided foam, which is lightest, thereby making for the middle of the chamber, whereas the continuously entering mass, which is heavier, will rotate along the cylinder wall and undergo the same process, so that a continuous production of most finely divided foam will thereby take place.

The interior of the cylinder will thus be filled with a circulating body of foam, the density of which decreases towards the middle whereas the layers rotating next to the cylinder wall are heavier, because the production of foam has not yet arrived at its maximum.

The body of foam accumulated in the middle of the cylinder and being excessively finely divided is forced by the pressure in the cylinder chamber through an outlet in the end wall of the cylinder and through a rubber tube to the place where it is to be used and where it is poured upon a surface which is either on fire or should be prevented from taking fire.

The body of foam will be spread out as a layer which will immediately choke a fire or prevent inflammable material from taking fire.

A constructional form of an apparatus for carrying out the method according to the invention is shown in the accompanying drawing, in which:

Fig. 1 shows the apparatus partly in section,
Fig. 2 is a section along the line II—II of Fig. 1,
Fig. 3 illustrates a detail.

1 is a rotary pump of any well known type having at the suction side of its casting a pipe connection 2 into which a water suction pipe 3 projects together with a pipe 4 through which the foam producing material, in suspension in water or other suitable liquid, may be drawn into the pump.

Mounted on the pipe connection 2 is also an air valve 5 opening inwardly and held in closed position by a spring 6, the tension of which may be regulated by means of a nut 7 on the valve stem.

When the suction height of water is made equal to that of the foam producing liquid, the diameters of the pipes 3 and 4 and the tension of the spring 6 may be so adapted relatively to one another that, by the vacuum produced by the pump during normal action, just such quantities of foam producing liquid, water and air may be drawn in as are necessary for the production of a quantity of foam corresponding to the capacity of the pump.

With a pump having a capacity of 1000 litres per minute it will be suitable to supply 2–3 litres of foam producing liquid, 60–70 litres of water and about 930 litres of air.

At the pressure side of the pump casting, is mounted a vertical pipe 8 of relatively large diameter, in the interior of which a number of horizontal networks 9 or the like are piled up mounted in rings 9a, the top of the pipe projecting into a cylindrical casing 10 screwed on to the pipe 8 and having its axis perpendicular to the axis of the pipe 8. Above the inlet opening of the pipe 8 in the casing 10 a resilient curved tongue 11 is provided having one end fixed to the cylindrical inner wall of the casing 10 whereas the free end of the tongue is pressed against the cylinder wall by a considerable resilient pressure.

The radius of curvature of the tongue is greater than that of the cylinder, and a narrow space 12 is therefore formed between the tongue and the cylinder wall, the said space being in direct connection with the pipe 8. The width of the tongue corresponds to the distance between the plane end walls of the casing 10. One of these end walls carries a pipe connection 12a ending in the middle of the cylinder and having a hose or the like slipped on.

In the middle of the casing a star-shaped member 13 is mounted immovably with its ribs disposed on a cone 14. A bolt 15 is carried axially through the said cone. One end of the bolt 15 is carried through a hole in one end wall of the cylinder, against which end wall the head of the bolt abuts, and the other end of the bolt passes through a hole in a cross 16 in the pipe connection 12a and is fastened by means of a nut 17.

The operation is as follows:

Through the piston of the rotary pump the suction water and the foam producing material together with the air entering through the valve 5 are carried from the suction side of the pump to the pressure side, and the mixture is forced upward through the pipe 8 in which it passes the networks 9 thereby being subjected to a preparatory foam producing treatment. From the pipe 8 the foamy mass is forced into the space 12 acting on the outside of the tongue 11, and the pressure is just able to surmount the resilient pressure of the tongue so that a very narrow inlet 11a for the mixture is produced at the free end of the tongue. When the resilient pressure of the tongue is sufficiently great, the said inlet 11a will only be small, and the mixture will therefore be pressed through it at an excessively great velocity leaving the inlet in a direction tangential to the cylinder surface.

As above described the foamy mass will therefore circulate in the cylinder and be subjected to a centrifugating action, the foam body which is transformed into complete foam and which is lightest being thereby forced towards the middle of the cylinder and poured out through the pipe connection 12a, whereas the heavier mixture is circulated adjacent the wall of the cylinder. Thus the cylinder serves as a means of more completely mixing the air, liquid and foaming agent, and also as a means of separating the lighter completed foam from the heavier less complete foam.

The ribs of the stationary star-shaped member 13 will partly peel off the finished foam body somewhat, and partly serve as baffle plates leading the foam to the outlet.

The pipe connection 2 and the pipe 8 have each of them a flange 18 and 19 respectively against which a forked transverse member 20 may abut. The forked member 20 is held by means of a bolt 21 with a nut 22, and when this is tightened against the transverse member 20 the pipe connection 2 and the pipe 8 will be held in position. By this arrangement the two members may be easily mounted on a pump instead of the suction and pressure pipes which are generally fastened by a transverse member and a bolt, and a water pump may thus be quickly transformed into a foam pump and vice versa.

Having now particularly described and ascertained the nature of my said invention and in what manner the same is to be performed, I declare that what I claim is:

1. Apparatus for preparing foam, comprising means for mixing water, air and foam producing material in proper proportions, a pump attached to said means and adapted to receive the mixture, an outlet conduit attached to the pump, said conduit containing a plurality of superposed spaced networks, the pump being adapted to force the mixture through the series of networks, a hollow cylinder having a horizontal axis, said cylinder being attached to the outlet from the pump, a resilient member within the hollow cylinder, one end of the resilient member being fastened to the wall of the hollow cylinder and the other end being free and slightly spaced from the wall of the cylinder in a circular direction so as to leave a slight space between the free end of the resilient member and the wall of the cylinder, the intermediate portion of the resilient member being spaced from the adjacent portion of the wall of the cylinder, the width of the resilient member being substantially that of the cylinder, so that the mixture extruded from the horizontal networks is passed from the conduit into the space between the intermediate portion of the resilient member and its adjacent portion of the cylinder wall and thereafter through the small opening between the free end of the resilient member and the cylinder wall.

2. A method of preparing foam comprising mixing and agitating water, air and foam producing material in such proportions as to produce a foam of desired consistency, placing the mass under pressure, extruding the mass in a fine stream at high velocity into a zone of lower pressure and centrifugally separating the completely aerated foam from the incompletely aerated foam.

3. A method of preparing foam comprising mixing and agitating water, air and foam producing material in such proportions as to produce a foam of desired consistency and centrifugally separating the completely aerated foam from the incompletely aerated foam.

4. A method of preparing foam comprising mixing and agitating water, air and foam producing material in such proportions as to produce a foam of desired consistency, reducing the size of the bubbles produced and centrifugally separating the completely aerated foam from the incompletely aerated foam.

5. An apparatus for preparing foam comprising means for aerating a liquid to produce a foam, a chamber containing a plurality of members having fine apertures therein, said aerating means being associated with said chamber and adapted to force the foam produced into the chamber and through the apertures in the members, and means associated with the discharge end of the chamber for centrifugally separating the completely aerated foam from the incompletely aerated foam.

6. An apparatus for preparing foam comprising means for aerating a liquid to produce a foam, a chamber associated therewith and means for extruding the foam produced into the chamber in a fine stream flowing at high velocity in a circular path for separating the completely aerated foam from the incompletely aerated foam.

7. An apparatus for preparing foam comprising means for aerating a liquid to produce a foam, a cylindrical chamber associated therewith, said chamber having a discharge opening positioned axially thereof, and means for introducing the foam produced into the chamber in a fine stream of high velocity in a direction tangential to the cylindrical wall of the chamber.

8. An apparatus for producing foam comprising means for mixing air, liquid and a foam producing material, a conduit means for agitating the mixture and forcing the same through the conduit, means in the conduit for reducing the size of the bubbles, a cylindrical chamber attached to the discharge end of the conduit, said conduit being connected with the chamber in such a manner as to normally discharge the foam flowing through the conduit radially into the chamber, and means in the chamber for causing the foam discharged from the conduit to flow in a tangential direction.

9. An apparatus for preparing foam comprising means for aerating a liquid to produce a foam, means associated therewith for centrifugally separating the completely aerated foam from the incompletely aerated foam, and means for automatically regulating the quantity of air mixed with the liquid to maintain the proper proportion of air and liquid irrespective of the quantity of liquid introduced into the apparatus.

10. An apparatus for producing foam comprising means for mixing air, liquid and a foam producing material, a conduit means for agitating the mixture and forcing the same through the conduit, means in the conduit for reducing the size of the bubbles, a cylindrical chamber attached to the discharge end of the conduit, said conduit being connected with the chamber in such a manner as to normally discharge the foam flowing through the conduit radially into the chamber, and resilient means in the chamber and positioned over the discharge end of the conduit for redirecting the flow of foam tangentially in the chamber and for causing the foam to flow in a fine stream at a high velocity.

JACOB CHRISTIAN HANSEN-ELLEHAMMER.